(12) United States Patent
Althaus et al.

(10) Patent No.: US 6,631,422 B1
(45) Date of Patent: *Oct. 7, 2003

(54) NETWORK ADAPTER UTILIZING A HASHING FUNCTION FOR DISTRIBUTING PACKETS TO MULTIPLE PROCESSORS FOR PARALLEL PROCESSING

(75) Inventors: Gregory Scott Althaus, Austin, TX (US); Tai-Chien Daisy Chang, Austin, TX (US); Herman Dietrich Dierks, Jr., Round Rock, TX (US); Satya Prakesh Sharma, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,741

(22) Filed: Aug. 26, 1999

(51) Int. Cl.[7] .............................................. G06F 13/00
(52) U.S. Cl. ...................... 709/250; 709/103; 709/230
(58) Field of Search ................................ 709/103, 230, 709/236, 238, 250

(56) References Cited

U.S. PATENT DOCUMENTS

| | | | | |
|---|---|---|---|---|
| 4,543,630 A | * | 9/1985 | Neches | |
| 5,938,736 A | * | 8/1999 | Muller et al. | 709/243 |
| 5,991,302 A | * | 11/1999 | Berl et al. | 370/400 |
| 6,359,886 B1 | * | 3/2002 | Ujihara et al. | 370/392 |

OTHER PUBLICATIONS

"Packet Resequencing Algorithm with Priority Support", IBM Technical Disclosure Bulletin, Dec. 1, 1993, vol. 36, Issue 12, p. 77–80.*

* cited by examiner

*Primary Examiner*—Viet D. Vu
(74) *Attorney, Agent, or Firm*—Duke W. Yee; Robert M. Carwell; Cathrine K. Kinslow

(57) ABSTRACT

Network input processing is distributed to multiple CPUs on multiprocessor systems to improve network throughput and take advantage of MP scalability. Packets are received by the network adapter and are distributed to N receive buffer pools set up by the device driver, based on N CPUs being available for input processing of packets. Each receive buffer pool has an associated CPU. Packets are direct memory accessed to one of the N receive buffer pools by using a hashing function, which is based on the source MAC address, source IP address, or the packet's source and destination TCP port numbers, or all or a combination of the foregoing. The hashing mechanism ensures that the sequence of packets within a given communication session will be preserved. Distribution is effected by the network adapter, which sends an interrupt to the CPU corresponding to the receive buffer pool, subsequent to the packet being DMAed into the buffer pool. This optimizes the efficiency of the MP system by eliminating any reliance on the scheduler and increasing the bandwidth between the device driver and the network adapter, while maintaining proper packet sequences. Parallelism is thereby increased on network I/O processing, eliminating CPU bottleneck for high speed network I/Os and, thus, improving network performance.

28 Claims, 5 Drawing Sheets

NETWORK ADAPTER UTILIZING A HASHING FUNCTION FOR DISTRIBUTING PACKETS TO MULTIPLE PROCESSORS FOR PARALLEL PROCESSING

BACKGROUND OF THE INVENTION

1. Technical Field

This invention relates to input processing for computer networks and, more particularly, to technology for improving throughput in such systems having multiprocessor implementations.

2. Description of Related Art

In computer network systems, notably those which are UNIX operating system based, network traffic from a plurality of clients and servers incoming on the network is in need of processing. This network input processing for a given network input/output (I/O) device has, in the past, always been single threaded processing at the interrupt level, whereby all inbound packets from a network device are processed sequentially. Early in the stages of computer networks, this was not necessarily a significant problem.

However, with the maturation of computer technology, it is becoming more commonplace to encounter computer network systems involving a number of CPUs present on the system (being referred to in the art as multiprocessor or MP systems). The weakness of single threaded processing, as a result of the evolution of MP systems, has now become apparent due to bottlenecks caused by this single thread processing. In the past, with single CPU systems, this bottleneck was not as visible. However, as noted with the advent of MP systems, internet servers have grown bigger and faster, with multiple CPUs with 8-way and 12-way CPU systems (e.g., including 8, 12 or more CPUs) becoming more and more commonplace. The inherent weakness of this single thread processing mode is that the aforementioned network input, in accordance with prior art technology, is processed only by a single CPU at any given time, regardless of the number of CPUs on the system available for such processing.

Therefore, a system and method is highly desired, given this maturation of computer network technology into MP systems, whereby such network input processing can take better advantage of the MP scalability, so as to improve network throughput on larger network servers.

In an effort to address this problem, various systems have been developed, employing differing techniques for queuing inbound packets. However, such systems suffer from very serious drawbacks. First, they are not tied to MP scalability. Furthermore, they do not address the problem of out-of-order packets caused by distributing the incoming packets to multiple parallel processing nodes.

Queuing is a method that has long been known for seeking to parallelize processing in order to increase throughput and distribute workloads. However, a serious problem with this, in the context of the present invention, is that, in accordance with such conventional queuing, one of a multiple of CPUs can, in fact, obtain a packet from a queue for processing; however, there is no assurance, with such multiple processors obtaining packets in this manner, that the packet order will be maintained. It is extremely important that this order be maintained for upper level network protocols.

Once systems expanded to more than one CPU, to process packets for throughput and concurrency, loss of control of scheduling the packets in their order occurred in previous systems. While this, in and of itself, was not fatal to operation of multiprocessor systems employing queues, once packets are out of order and flowing up to an endpoint of the system, additional resources must be expended in order to process and correctly re-sequence these packets in the protocol stack. This additional processing in order to ensure correct packet sequencing, in itself, is time consuming, so as to result in little net gain otherwise afforded by employing queues, multiple CPUs, and parallelization in the first place.

One practical problem resulting from the inability to provide for network input distributed processing is that throughput of an individual CPU on the order of 100 megabits per second is less than that of network adapter cards, which may nominally have throughputs of one gigabyte per second, i.e., operating at a 10× factor faster than the CPU. In accordance with conventional prior practice, wherein no more than one CPU at a time could be processing packets associated with one of the network I/O devices, the net result was that network throughput was CPU bound. That is to say, throughput could not exceed the capacity of a single CPU running interrupts and processing incoming packets from a single given physical interface. Thus, network throughput was CPU bound, even in MP systems. It became increasingly difficult to justify to potential customers of MP systems why they should invest significant amounts of money for these systems without enjoying a concomitant gain in network I/O performance. Similarly, it became increasingly difficult to justify that a customer should invest in faster and more expensive network adapter cards (which, as noted, may, in some instances, have a capability 10 times faster than the CPUs themselves) when, upon installing such an adapter, the customer still does not see a 10× performance increase (due to the aforementioned bottleneck caused because only a single CPU is servicing incoming traffic at any given time, notwithstanding the presence of other processors with concurrent processing capability). Therefore, there was a need to demonstrate to the customer, improvements in system performance to justify the associated cost of adding additional CPUs in MP systems, as well as more expensive adapter cards.

Although queuing inbound packets was known, these prior efforts were not tied to MP scalability, and such efforts did not address the aforementioned problem of out-of-order packets. It will be appreciated that this is a key shortcoming of prior art attempts to solve the problem of distributing random input to multiple engines while, nevertheless, maintaining the important input sequence for the upper layer protocol (mainly TCP/IP) to work properly. As previously noted, these out-of-order packets cause severe performance problems for such protocols as TCP or UDP due, in part, to the overhead associated with sorting out the proper packet sequences.

Other efforts for accessing fuller processing capacity available from MP systems include performing a hash function for providing a sequencing to the packets received by the device driver. The hash function is performed subsequent to the packets being received from the network adapter by the host memory. While this scheme provides queuing and parallelization, it relies heavily on a scheduler for scheduling CPUs. Schedulers that place a low priority on input processing of packets significantly reduce the efficiency of the MP system. Furthermore, the connection between individual network adapters and device drivers remains single threaded, thereby reducing the transfer rate between the two.

SUMMARY OF THE INVENTION

Network input processing is distributed to multiple CPUs on multiprocessor systems to improve network throughput and to take advantage of MP scalability. Incoming packets are received by the network adapter and are distributed to N CPUs for high priority processing, wherein N is the number of receive buffer pools set up by the device driver, based on N CPUs being available for input processing of packets. Each receive buffer pool has an associated CPU. Packets are direct memory accessed to one of the N receive buffer pools by using a hashing function based on the source MAC address (source hardware address), source IP address, or the packet's source and destination TCP port number, or all or a combination of the foregoing. The hashing mechanism ensures that the sequence of packets within a given communication session will be preserved. Distribution is effected by the network adapter, which sends an interrupt to the CPU corresponding to the receive buffer pool, subsequent to the packet being DMAed into the buffer pool, thereby optimizing the efficiency of the MP system by eliminating any reliance on the scheduler and increasing the bandwidth between the device driver and the network adapter, while maintaining proper packet sequences.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
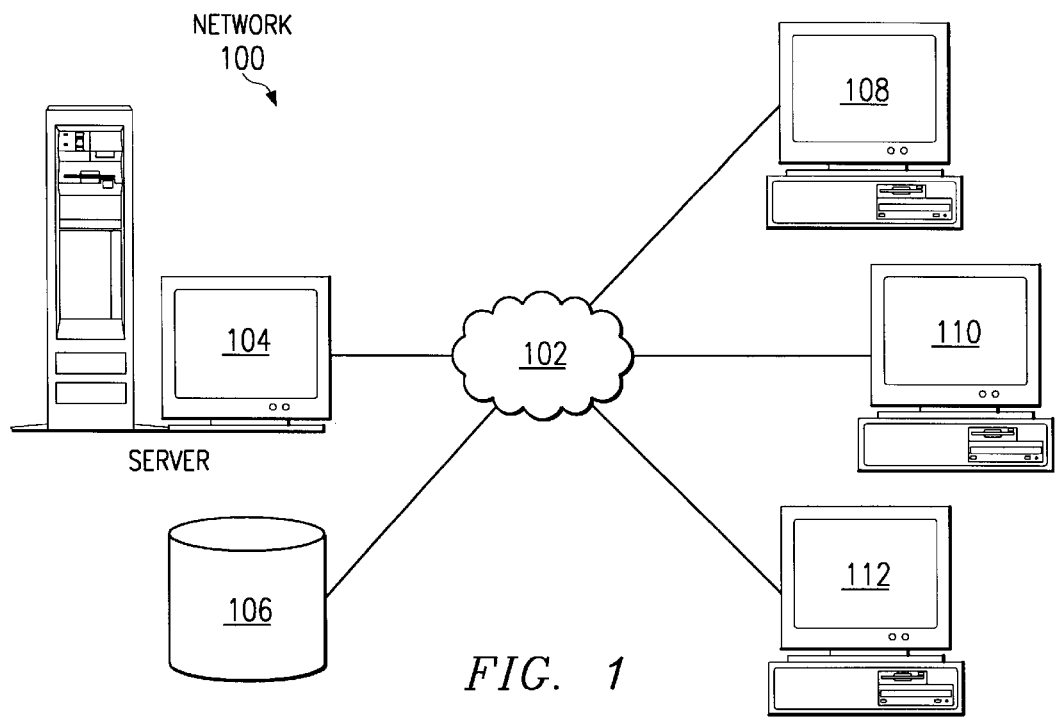
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network which receives a program or other application from another computer coupled to the network. In the depicted example, server 104 provides data, such as boot files, operating system images, and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as an intranet or a local area network.

FIG. 1 is intended as an example and not as an architectural limitation for the processes of the present invention.

Figure 2:
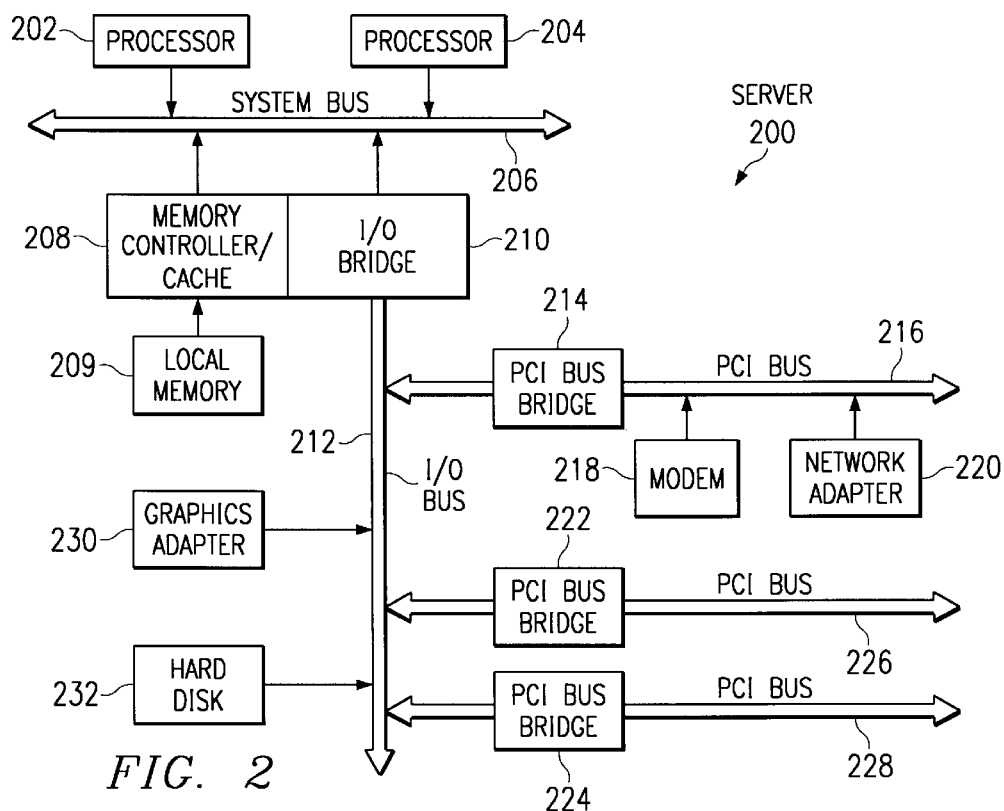
FIG. 2 is a block diagram of a data processing system which may be implemented as a server.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Modem 218 and network adapter 220 may be connected to PCI bus 216. A network adapter is generally defined as any circuitry that allows devices to communicate with other devices on a particular network such as the Internet, an intranet or other network configuration including local area networks (LAN) and wide area networks (WAN). Typical PCI bus implementations support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used, in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
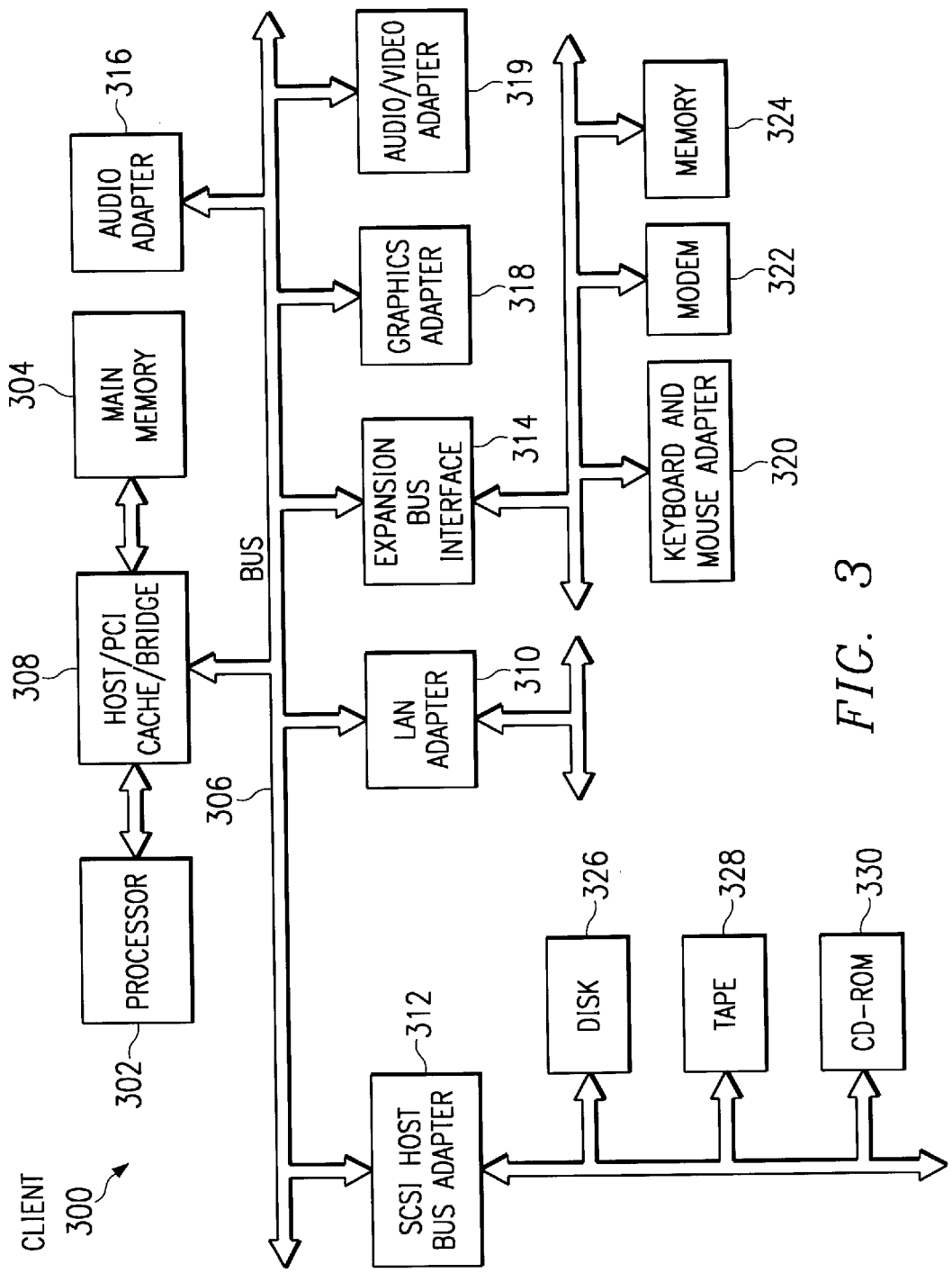
FIG. 3 is a block diagram of a client as depicted by clients 108, 110 and 112 in FIG. 1.

With reference now to FIG. 3, a block diagram of a client as depicted by clients 108, 110 and 112 in FIG. 1. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations support three or four PCI expansion slots or add-in connectors.

In the present example, an operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation, or a UNIX based system such as AIX also available from International Business Machines Corporation. An object oriented programming system such as Java may run in conjunction with the operating system and provides calls to the operating system from Java™ programs or applications executing on data processing system 300. Java Text Markup Language (JTML) is an HTML-like language which enables users to use Java with the ease of using HTML for creating web pages. JTML is an integrated package of tools for the development of Java applets and user interfaces. It allows almost anyone with a need for online communication to create state-of-the-art applets without understanding Java programming concepts. JTML allows administrators to set up personal user accounts for authorizing users and to set up routines for automatically recording transactions between a JTML server and individual users. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing systems.

Figure 4:
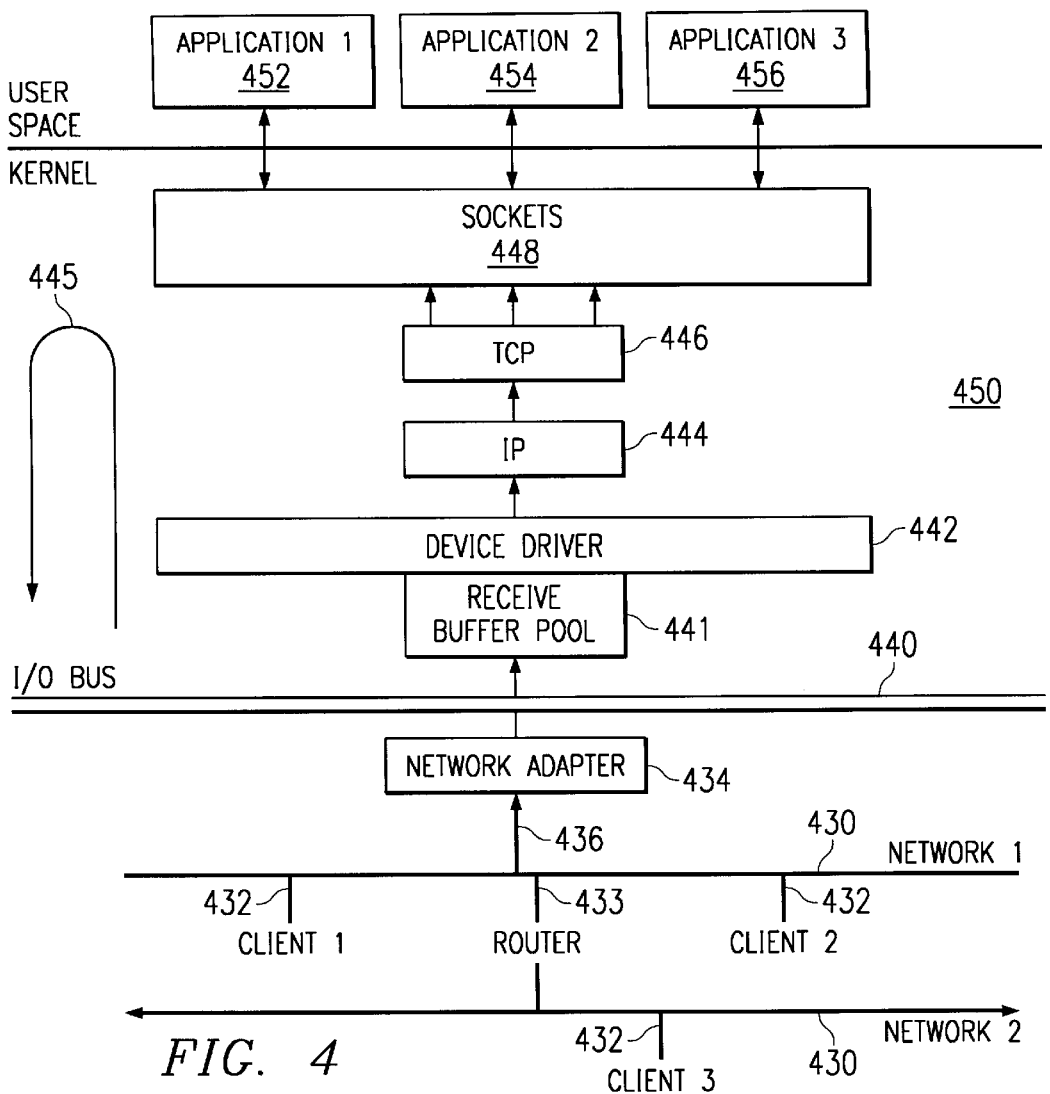
FIG. 4 is an architectural illustration of a typical computer network system known in the art, which includes kernel details.
Figure 5:
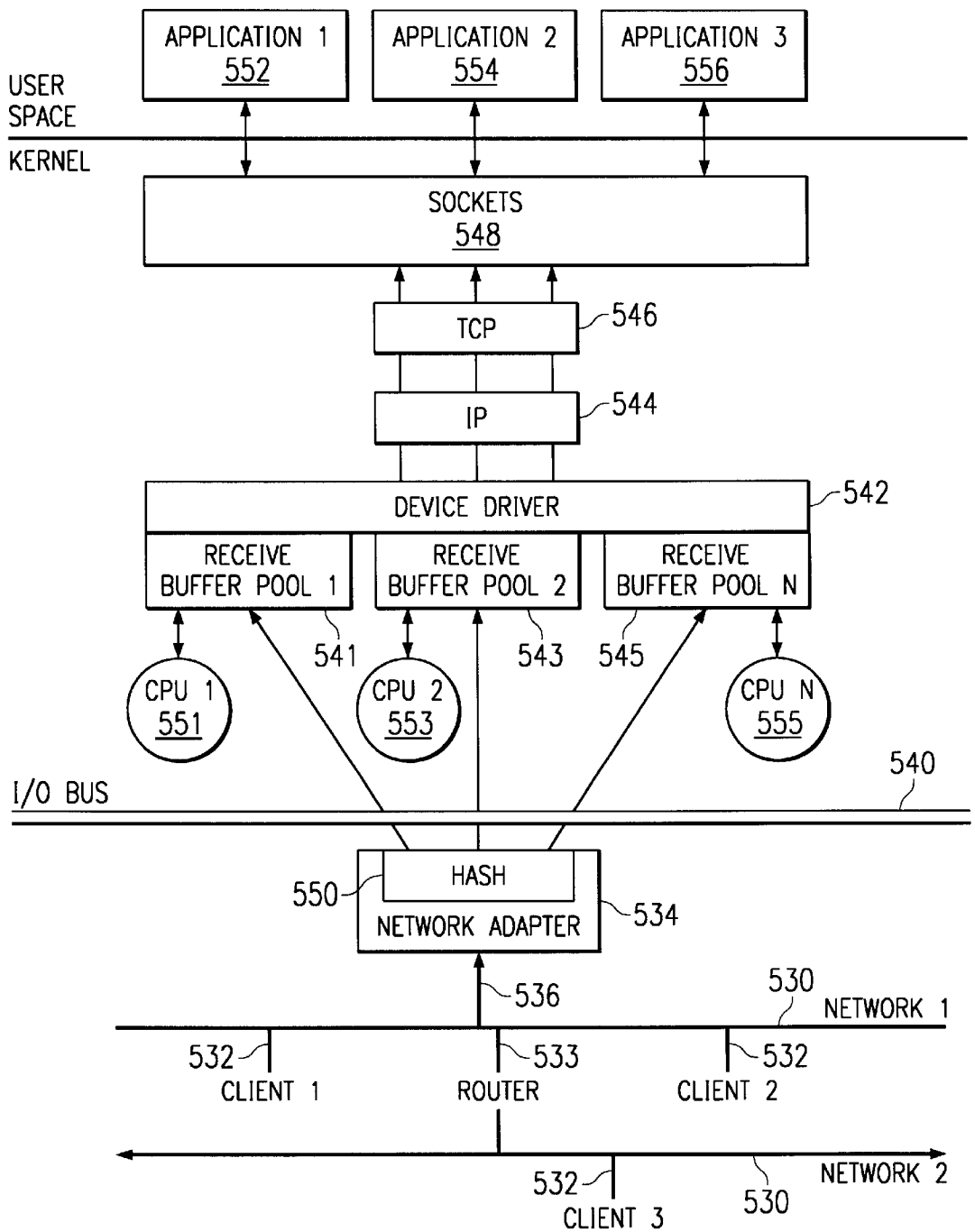
FIG. 5 is a diagram depicting a preferred embodiment of the present invention for improving network throughput by more efficiently employing additional CPUs in an MP system by distributing the interrupt workload among all of the CPUs.

FIGS. 1–3 illustrate a preferred embodiment of a computer system which may advantageously employ the improved packet sequencing system of the present invention. The systems of FIG. 1 may be seen to represent clients and/or servers in network configurations which are depicted in FIGS. 4 and 5. FIGS. 4 and 5 further depict the data flow within a network server.

Turning now to FIG. 4, depicted therein is an architectural illustration of a typical computer network system known in the art. A plurality of client machines 432 are interconnected to networks 430, with such networks, in turn, being connected in a manner well known in the art, as required by means of various routers 433. Networks 430, in turn, are conventionally interconnected to at least one network adapter 434, as shown by connection 436, which is operating on an I/O bus 440, also well known in the art.

Also associated with network adapter 434 is device driver 442 for processing incoming direct memory access (DMA) packets. The device driver receives incoming DMAed packets in a single receive buffer pool 441, one pool per network adapter. Device driver 442, in turn, conditions the incoming packets so they are received and processed in accordance with a conventional TCP/IP protocol. The throughput associated with any device driver, such as device driver 442, is single threaded. Therefore, device driver 442 need only set up a single receive buffer pool 441 to handle all DMA packets, no matter how many CPUs simultaneously process the DMAed packets. Accordingly, the DMAed packets include network packet header information consistent with this protocol, as detailed in FIG. 6 below. In accordance with such protocol, incoming packets are processed through the various layers of the TCP/IP protocol, specifically internet protocol (IP) 444, followed by transfer control protocol (TCP) layer 446, whereupon these packets are then distributed in accordance with the addresses associated therewith (shown in FIG. 4) to corresponding ones of a plurality of sockets 448.

It would be appreciated that these TCP/IP and socket layers comprise a portion of the kernel of the server. An operating system, which may be UNIX-based or an AIX system, or other derivative operating systems of UNIX, or any other correlative operating system, is desired. Sockets 448, in turn, will be interconnected to a plurality of corresponding applications 452, 454 and 456, residing in the user space and interconnected across user space/kernel boundary 450 in the manner shown in FIG. 4.

One important feature or, more precisely, drawback of the described networking system architecture in FIG. 4 must be pointed out. It will be noted that, in accordance with prior art practice, processing of incoming packets on I/O bus 440 experiences single thread processing well known in the art, at the interrupt level. What this means is that all inbound packets from a network device, such as network adapter 434, will be processed sequentially as they proceed through the various layers of the TCP/IP protocol. This may be seen schematically illustrated by means of single arrow 445, symbolizing such sequential single thread processing through the various layers of the server kernel.

Turning now to FIG. 5, depicted therein is a system architecture illustration similar to that of FIG. 4 but incorporating several important differences, which give rise to the increased throughput provided by the present invention. First, some general discussion will be provided of how this objective is accomplished, followed by a more detailed description of a representative modification of the system architecture of FIG. 4, shown in FIG. 5. It will be recalled that one objective of the present invention is to provide more concurrency by employing the MP feature of modern network systems, whereby multiple CPUs can simultaneously process more packets per second, such an objective being accomplished by queuing the packets in queues or receive buffer pools in device driver 442 as shown in FIG. 4.

More particularly, as described in greater detail below, every inbound packet will be queued onto an IP queue by hashing, wherein the number of IP queues will equal the number of CPUs in the MP system. This is unlike the situation with reference to FIG. 4, wherein only single thread processing transpires, resulting in sequential processing of inbound packets. In accordance with the present invention, as depicted in FIG. 5, this IP queue is concurrently processed by multiple threads, with one thread per CPU and one queue per thread. In this manner, the path length is shortened, with more CPUs running parts of a packet's code simultaneously in a multithread fashion, thereby effecting the increased throughput.

It will be recalled that, in accordance with prior art practice associated with the system of FIG. 4, incoming packets on network 430 each generate an interrupt. Conventionally, when the system of FIG. 4 thus receives an interrupt, one of the CPUs of the system is interrupted and begins handling the incoming packets. When the CPU is through processing all packets, the interrupt handling has been completed, and the CPU returns to a normal context level.

The practical import of this is that, during the entire interrupt handling period, the interrupted CPU will only be looking at handling and processing each particular data packet, either responding to it or handing it off for delayed processing, until such processing is complete. During this interrupt period, however, no other processor can assist a process or handling of an interrupt and its associated tasks. That is to say, these other processors cannot be doing anything relative to the tasks of the CPU handling a given interrupt and its packets.

Also, the interrupt will mask off all other activities that the interrupted CPU could otherwise be handling while the packet is being processed (e.g., normal time slice scheduling and handling of any other user applications). Even as more CPUs are added to the system in the prior art, when an interrupt comes in, only a single CPU will obtain the interrupt and start processing it. Even with these additional CPUs all concurrently processing, if any one CPU obtains an interrupt from network adapter 434, only traditional single thread processing transpires, wherein inbound packets from the device are processed sequentially by the single CPU.

During this period, assistance from the remaining CPUs, which may have available processing power, is effectively paralyzed, such that these supplemental CPUs cannot perform meaningful work on these packets until conventional interrupt processing of this single thread processing at the interrupt level is completed. The remaining CPUs may be performing meaningful work, but at any given time only one CPU will be processing packets. Only one of them will be processing the DMAed packets associated with an interrupt and the particular network device, and therefore that CPU will be exclusively tied up with such processing without assistance from the other CPUs.

In an effort to increase overall system efficiency, the inventors of the present invention proposed to perform a hash function for providing a sequencing to the packets received by the device driver in U.S. patent appication Ser. No. 91/213,920, Attorney docket number AT9-98-299, "System and Method for Sequencing Packets for Multiprocessor Parallelization In A Computer Network System," filed on Dec. 17, 1998, which is incorporated in its entirety herein. While that invention does provide queuing and parallelization by employing the source hardware addresses or media access control (MAC) addresses, IP addresses, and the application port addresses or numbers, whether alone or in combination, that scheme suffers drawbacks in that simultaneous parallel input processing of packets in a queue is a function of the scheduler. Therefore, while multiple CPUs may be able to process multiple incoming packets received from a single network device, some scheduling overhead will inevitably occur. In other words, distributing packets via software queues may result in delayed processing of the packets, and the network performance will be subject to the efficiency of the MP process scheduling mechanism. Additionally, the connection between individual network adapters and the device driver remains single threaded, thereby reducing the transfer rate between the two.

Turning now to FIG. 5 in more detail, in accordance with the present invention, in order to improve network throughput by more efficiently employing additional CPUs in an MP system, an important concept of the present invention is to distribute the interrupt workload among all of the CPUs so that the parallel input processing can be achieved without the additional scheduling overhead. As previously noted, prior systems might have employed queuing inbound packets, but these systems did not address scalability, nor did they provide solutions to out-of-order packets. As previously described, packet order must be maintained, because out-of-order packets cause severe performance problems, and important input sequence must be maintained for upper layer protocol, such as the protocol stack depicted in FIG. 4, to work properly. There is a "fastpath" architected through conventional TCP/IP layers; but in order to enjoy the benefits thereof, this fastpath depends upon packets arriving in the proper sequence.

Techniques exist for ensuring packets being received from a client are sequenced properly, regardless of whether in the conventional TCP/IP or other network protocol form. The present invention applies this sequencing in the context of improved parallelization of multiple CPUs in a network system. Referring to FIG. 5 in greater detail, additional functionality is provided, extended to network adapter 534, including hashing function 550. Incoming packet processing is extended from network adapter 534 to each of a plurality of receive buffer pools 541, 543 and 545. Receive buffer pools 541, 543 and 545 are depicted in a multithread arrangement, with a plurality of CPU engines, depicted by CPUs 551, 553 and 555, of an MP system running on them. The invention provides a sequencing to the packets received by network adapter 534 so that, as they proceed through the protocol stacks of FIG. 6, they arrive in sequence. In FIG. 5, the number of receive buffer pools 1 through N provided, equals the number of CPUs 1 through N, so that these multiple CPUs can be simultaneously working to process packets.

As in conventional systems, each packet has its own unique address. In one implementation of the present invention, advantage is taken of the fact that media access control (MAC) addresses may be utilized for this hashing and sequencing, as in the familiar Ethernet. Each network interface card (NIC), conventionally, may have, for example, a 48 bit MAC, with each incoming packet associated therewith having a like MAC address for the originating network endpoint. It is a feature of the present invention to hash, in accordance with hash function 550 shown in FIG. 5, each of these MACs into the aforementioned plurality of receive buffer pools 541, 543 and 545. A hash provided by hash function 550 at network adapter 534 will occur for each incoming packet, so the packets originated from the same originator will be direct memory accessed into the same particular receive buffer pool. Importantly, network adapter 534 then sends an interrupt to the CPU, which corresponds to the selected receive buffer pool, to initiate input processing. Therefore, packets originated from multiple originators can be processed in the interrupt mode by multiple CPUs, simultaneously, while the packet sequence from each originator is well kept.

Figure 6:
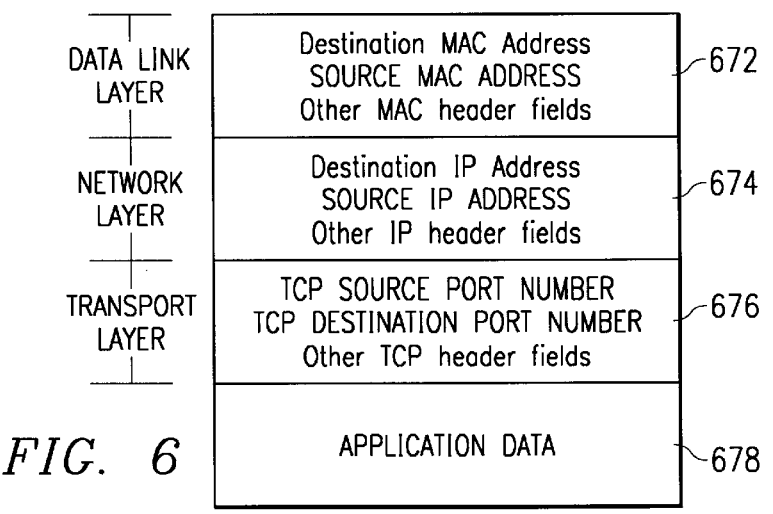
FIG. 6 depicts a representative network packet header being for the familiar TCP/IP protocol.

Turning now to FIG. 6, depicted therein is a representative protocol stack, advantageously employed in a manner to be hereinafter described, such network packet header being for the familiar TCP/IP protocol. As is well known in the art, such a protocol is conventionally comprised of a plurality of layers, the first of which is data link layer 672, which includes the previously described MAC header fields. The source MAC Address, which identifies the particular I/O device at the packet originator, is the first element used in hash function 550 in FIG. 5. Data link layer 672, in turn, is followed by network layer 674, which includes a source IP address and various IP headers. Next, transport layer 676 is provided, which includes TCP source and destination port numbers. This stack is then completed with application data 678, corresponding to applications 552 through 556 of FIG. 5.

Although the source MAC was described as being employable to effect the sequencing of packets in one embodiment of the invention, the invention is not intended to be so limited and admits to other mechanisms employing differing components of the protocol stack. Thus, for example, it is specifically contemplated to employ a combination of addresses just described as resident in a typical protocol stack, such as stacks 544 and 546 in FIG. 5.

One reason for a different approach, other than employing the source MAC address alone, is as follows. In a given network, a router box may be employed to route packets originated from thousands of clients on networks that are not immediately connected to the server system (refer to "Network 2" as depicted in FIG. 5). However, packets will appear as originating from a single MAC address (i.e., the router's MAC address). Accordingly, in the previously described embodiment the present invention, a benefit of distribution of packets among CPUs cannot be enjoyed in as much as, if the MAC address alone is employed, all packets will be directed to the same CPU for processing.

However, upon recognizing that all clients have unique IP addresses 674, this fact may be advantageously employed to avoid the aforementioned problem. Therefore, it is specifically contemplated that, in routing packets to appropriate receive buffer pools 541, 543 and 545, employing hashing function 550, a combination of source MAC address 672 and source IP address 674 may be employed to further distribute the workload of processing the packets.

In a third case, instances may arise where the number of clients is not large, as in the previously described case, but there is a single large client or small number of large clients. There may be many different applications running on a particular client. If only the IP address is employed, again, the result is, essentially, that only one client, resulting in the undesirable affect of not maximizing distribution of packets among the CPUs. In this instance, the invention specifically contemplates advantageously employing port numbers 676, since each such application will conventionally be associated with a particular pair of TCP source and destination port numbers. By thus employing port numbers, the system may more uniformly distribute packets among the receive buffer pools, to thereby obtain the parallelization of processing power in packet handling among the multiple CPUs on the server, as is a desired objective of the present invention. The sequence of packets may thereby be maintained between two applications.

Figure 7:
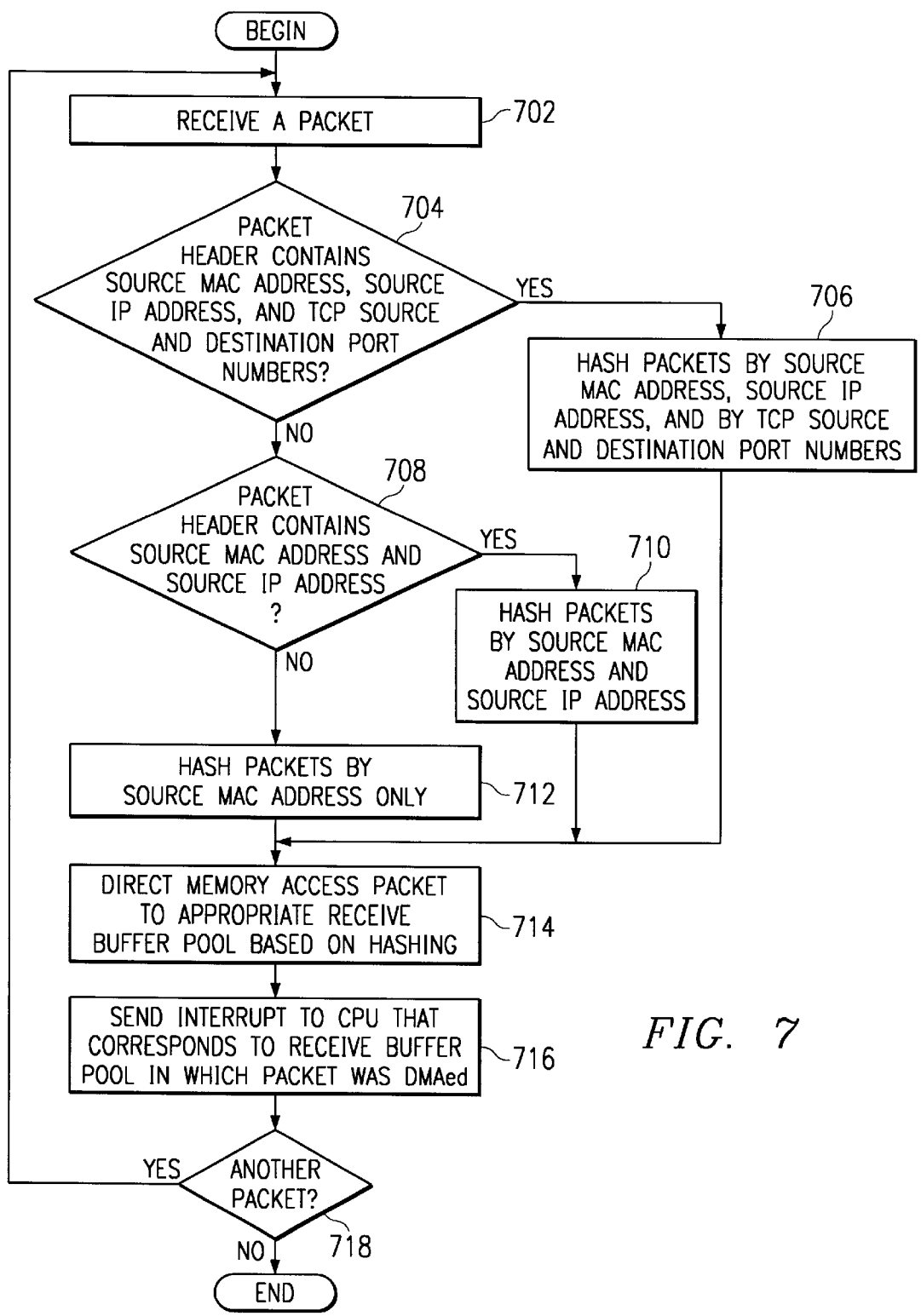
FIG. 7 is a flowchart depicting the process of the present invention as performed by the network adapter.

FIG. 7 is a flowchart depicting the process of the present invention as performed by the network adapter. Sometime prior to the commencement of the process, an appropriate device driver is initialized, and the network adapter is informed of the identities of receive buffer pools and CPUs associated with each receive buffer pool. The process then begins with the network adapter receiving a data packet from a client on the network (step 702). The hashing function is based on information available in the packet's header. Initially a determination is made as to whether the packet header contains all of the source MAC Address, the source IP address, and the source and destination TCP port numbers (step 704). In accordance with a preferred embodiment of the present invention, hashing will use at least one of the source MAC Address (data link header), source IP address (network header), and TCP source and destination port numbers (transport header) contained in each network packet header for TCP/IP protocol. The preference is to use all of the above for hashing. If available, the packet is then hashed using the source MAC address, the source IP address, and the source and destination TCP port numbers (step 706). The packet is then DMAed to the appropriate receive buffer pool by microcode on the adapter, based on the results of hashing (step 714).

Returning to decision 704, if it is determined that the packet does not contain all of the sorurce Mac address, the source IP address and the source and destination TCP port numbers, a second determination is made as to whether the packet header contains at least a MAC address and a source IP address (step 708). If the packet header contains both the source MAC address and a source IP address, the packet is hashed using the source MAC address and the source IP address (step 710). The packet is then DMAed to the appropriate receive buffer pool by microcode on the adapter, based on the results of hashing (step 714). Returning to step 708, if the packet header does not contain both the source MAC address and the IP address, then the packet is hashed using only the source MAC address (step 712). Each inbound packet is then direct memory accessed to the appropriate receive buffer pool by microcode on the adapter, based on the result of hashing (step 710).

In this example it is assumed that, in using the TCP/IP protocol, both the source IP address and the source and destination TCP port numbers will be available and, thus, used for hashing. Importantly, the present invention specifically envisions utilizing any protocol presently available or available in the future for hashing. While hashing in the present example is based on the TCP/IP protocols associated the network and transport layers of the OSI architecture, hashing may be based on any other protocol identified in the header of the packet. Similarly, the protocol may relate some architecture other than the OSI architecture.

Returning to step 714, following DMAing the packet to an appropriate receive buffer pool, the network adapter then sends an interrupt to the CPU that corresponds to the receive buffer pool (step 716). The process continues by checking for more packets (step 718). If other packets are available, the process returns to step 702 and the process repeats each available packet. If no other packets are available, the process ends.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for distributed processing of network packets in a network, comprising a multiprocessor system having a plurality of central processing units (CPUs ), wherein each CPU has an associated buffer pool, the method comprising:

receiving a packet at a network adapter;

accessing information in the packet;

distributing the packet using a hashing function from the network adapter to a buffer pool associated with a CPU, based on the information in the packet; and processing the packet with the CPU associated with the buffer pool.

2. The method of claim 1 further comprises:

delivering the packet to a protocol stack.

3. The method of claim 1, wherein the packet is the first packet, the method further comprising:

receiving a second packet at the network adapter;

accessing information in the second packet;

distributing the second packet using a hashing function, from the network adapter to the buffer pool associated with the CPU, based on the information in the packet;

processing the second packet with the CPU associated with the buffer pool; and delivering the first packet and the second packet to a protocol stack, in sequence.

4. The method of claim 1, further comprising sending an interrupt to the CPU associated with the buffer pool.

5. The method of claim 1, wherein processing the packet is performed in a high priority processing mode.

6. The method of claim 1, wherein the packet is the first packet, the buffer pool is the first buffer pool, and the CPU is the first CPU, the method further comprising:

receiving a second packet at the network adapter;

accessing information in the second packet;

distributing the second packet using a hashing function, from the network adapter to a second buffer pool associated with, a second CPU, based on the information in the packet;

processing the second packet with the second CPU associated with the second buffer pool; and delivering the first packet and the second packet to a protocol stack, in sequence.

7. A system for distributed processing of network packets in a network, comprising a multiprocessor system having a plurality of central processing units (CPUs), wherein each CPU has an associated buffer pool, the system comprising:

distributing means for distributing a plurality of packets using a hashing function, from the network adapter to a plurality of buffer pools associated with a respective plurality of CPUs, based on the information in each packet in the plurality of packets;

sending means for sending an interrupt to each CPU associated with a buffer pool, based on distributing a packet to the buffer pool;

processing means for processing the plurality of packets with the respective CPUs; and transferring means for transferring the plurality of packets to a protocol stack, in sequence.

8. The method of claim 1, wherein the hashing function uses one of a source MAC address, a source IP address, and a source and destination TCP port number.

9. The method of claim 4, wherein the network includes a plurality of network adapters.

10. The method of claim 1, wherein the information is contained in the header of the packet.

11. A method for distributed processing or network packets in a network, comprising a multiprocessor system having, a plurality of central processing units (CPUs), wherein each CPU has an associated buffer pool, the method comprising:

distributing a plurality of packets using a hashing function, from the network adapter to a plurality of buffer pools associated with a respective plurality of CPUs, based on the information in each packet in the plurality of packets;

sending an interrupt to each CPU associated with a buffer pool, based on distributing a packet to the buffer pool;

processing the plurality of packets with the respective CPUs; and transferring the plurality of packets to a protocol stack, in sequence.

12. The system of claim 7 further comprises:

delivering means is for delivering the plurality of packets to at least one protocol stack, in sequence.

13. The method of claim 11 further comprises:

delivering the plurality of packets to at least one protocol stack, in sequence.

14. The system of claim 7, wherein the hashing function uses one of a source MAC address, a source IP address, and a source and destination TCP port number.

15. The method of claim 11, wherein the hashing function uses one of a source MAC address, a source IP address, and a source and destination TCP port number.

16. The method of claim 15, wherein the network includes a plurality of network adapters.

17. A system for distributed processing of network packets in a network, comprising a multiprocessor system having a plurality of central processing units (CPUs), wherein each CPU has an associated buffer pool, the system comprising:

receiving means for receiving a packet at a network adapter;

accessing means for accessing information in the packet;

distributing means for distributing the packet using a hashing function, from the network adapter to a buffer pool associated with a CPU, based on the information in the packet; and processing means for processing the packet with the CPU associated with the buffer pool.

18. The system of claim 17 further comprises:
delivering means for delivering the packet to a protocol stack.

19. The system of claim 17, wherein the packet is the first packet, the system further comprising:
receiving means for receiving a second packet at the network adapter;
accessing means for accessing information in the second packet;
distributing means for distributing the second packet using a hashing function, from the network adapter to the buffer pool associated with the CPU, based on the information in the packet;
processing means for processing the second packet with the CPU associated with the buffer pool; and
delivering means for delivering the first packet and the second packet to a protocol stack, in sequence.

20. The system of claim 17, further comprising sending an interrupt to the CPU associated with the buffer pool.

21. The system of claim 17, wherein processing the packet is performed in a high priority processing mode.

22. The system of claim 17, wherein the packet is the first packet, the buffer pool is the first buffer pool, and the CPU is the first CPU, the system further comprising:
receiving means for receiving a second packet at the network adapter;
accessing means for accessing information in the second packet;
distributing means for distributing the second packet using a hashing function, from the network adapter to a second buffer pool associated with a second CPU, based on the information in the packet; processing means for processing the second packet with the second CPU associated with the second buffer pool; and
delivering means for delivering the first packet and the second packet to a protocol stack, in sequence.

23. The system of claim 14, wherein network includes a plurality of network adapters.

24. The system of claim 17, wherein the hashing function uses one of a source MAC address, a source IP address, and a source and destination TCP port number.

25. The system of claim 17, wherein the network includes a plurality of network adapters.

26. The system of claim 17, wherein the information is contained in the header of the packet.

27. A computer program product in a computer readable media for use in a data processing system for distributed processing of network packets in a network, comprising a multiprocessor system having, a plurality of central processing units (CPUs), wherein each CPU has an associated buffer pool, comprising:
instructions for receiving a packet at a network adapter;
instructions for accessing information in the packet;
instructions for distributing the packet using a hashing function, from the network adapter to a buffer pool associate with a CPU based on the information in the packet; and
instructions for processing the packet with the CPU associated with the buffer pool.

28. A computer program product in a computer readable media for use in a data processing system for distributed processing of network packets in a network, comprising a multiprocessor system having a plurality of central processing units (CPUs), wherein each CPU has an associated buffer pool, comprising:
instructions for distributing a plurality of packets using a hashing function, from the network adapter to a plurality of buffer pools associated with a respective plurality of CPU based on the information in each packet in the plurality of packets;
instructions for sending an interrupt to each CPU associated with a buffer pool based on distributing a packet to the buffer pool;
instructions for processing the plurality of packets with the respective CPUs; and
instructions for transferring the plurality of packets to a protocol stack in sequence.

* * * * *